US008667496B2

(12) United States Patent
Levin (10) Patent No.: US 8,667,496 B2
(45) Date of Patent: Mar. 4, 2014

(54) METHODS AND SYSTEMS OF MANAGING RESOURCES ALLOCATED TO GUEST VIRTUAL MACHINES

(75) Inventor: Alexander Levin, Beit-Shemesh (IL)

(73) Assignee: Host Dynamics Ltd., Tel-Aviv (IL)

( * ) Notice: Subject to any disclaimer, the term of this patent is extended or adjusted under 35 U.S.C. 154(b) by 175 days.

(21) Appl. No.: 13/279,356

(22) Filed: Oct. 24, 2011

(65) Prior Publication Data

US 2012/0174097 A1 Jul. 5, 2012

Related U.S. Application Data

(60) Provisional application No. 61/429,473, filed on Jan. 4, 2011.

(51) Int. Cl.
G06F 9/46 (2006.01)
G06F 9/455 (2006.01)
G06F 15/173 (2006.01)

(52) U.S. Cl.
USPC ............... 718/104; 718/1; 718/105; 709/223; 709/224; 709/225; 709/226

(58) Field of Classification Search
None
See application file for complete search history.

(56) References Cited

U.S. PATENT DOCUMENTS

| 7,756,943 | B1 * | 7/2010 | Wong ............................ 709/212 |
| 8,074,276 | B1 * | 12/2011 | Beloussov et al. .............. 726/22 |
| 2002/0052914 | A1 * | 5/2002 | Zalewski et al. .............. 709/203 |
| 2003/0037089 | A1 * | 2/2003 | Cota-Robles et al. ........... 709/1 |
| 2006/0184938 | A1 * | 8/2006 | Mangold ........................... 718/1 |
| 2007/0052715 | A1 * | 3/2007 | Levit-Gurevich et al. .... 345/542 |
| 2009/0089780 | A1 * | 4/2009 | Johnson et al. .................... 718/1 |
| 2009/0106754 | A1 * | 4/2009 | Liu et al. ........................... 718/1 |
| 2009/0265707 | A1 * | 10/2009 | Goodman et al. ................ 718/1 |
| 2010/0191845 | A1 * | 7/2010 | Ginzton ....................... 709/224 |
| 2010/0241785 | A1 * | 9/2010 | Chen et al. ........................ 711/6 |
| 2010/0251255 | A1 * | 9/2010 | Miyamoto et al. ........... 718/104 |
| 2010/0306173 | A1 | 12/2010 | Frank |
| 2011/0023028 | A1 * | 1/2011 | Nandagopal et al. ............. 718/1 |
| 2012/0137002 | A1 * | 5/2012 | Ferris et al. .................. 709/226 |

* cited by examiner

*Primary Examiner* — Emerson Puente
*Assistant Examiner* — Adam Lee (57) ABSTRACT

A method of managing one or more resources allocated to a plurality of guest virtual machines. The method comprises executing a plurality of guest virtual machines in a host platform managing at least one resource, allocating the at least one resource among the plurality of guest virtual machines, separately collecting, from each the guest virtual machine, resource usage data by locally monitoring at least one of an operating system operation, an executed procedure, and an executed tread in each the guest virtual machine, gathering the resource usage data from each the guest virtual machine, and reallocating the at least one resource among the plurality of guest virtual machines according to an analysis of the gathered resource usage data from the plurality of guest virtual machines.

22 Claims, 5 Drawing Sheets

METHODS AND SYSTEMS OF MANAGING RESOURCES ALLOCATED TO GUEST VIRTUAL MACHINES

RELATED APPLICATIONS

This application claims the benefit of priority under 35 USC 119(e) of U.S. Provisional Patent Application No. 61/429,473 filed Jan. 4, 2011, the contents of which are incorporated herein by reference in their entirety.

FIELD AND BACKGROUND OF THE INVENTION

The present invention, in some embodiments thereof, relates to virtualization and, more particularly, but not exclusively, to methods and systems of managing resources allocated to guest virtual machines.

During the last years, the concept of server consolidation prevails. Many small physical servers are replaced by one larger physical server to increase the utilization of costly hardware resources such as CPU, storage and network access. Although hardware is consolidated, the software is not. Instead, each server is replaced with a respective virtual machine having an operating system (OS) which is executed on the larger physical server. The large server hosts many such guest virtual machines; each executes programs like a physical machine. The hosting of the virtual machines is known as full virtualization. Full virtualization requires that every salient feature of the emulated hardware be reflected into one of several virtual machines—including the full instruction set, input/output operations, interrupts, memory access, and whatever other elements are used by the software that runs on the bare machine, and that is intended to run in a virtual machine. In such an environment, any software capable of execution on the raw hardware can be run in the virtual machine and, in particular, any operating systems.

Virtualization allows multiplexing of the underlying host machine between different virtual machines. The host computer allocates a certain amount of its resources to each of the virtual machines. Each virtual machine is then able to use the allocated resources to execute applications, including operating systems, referred to as guest operating systems. The software layer providing the virtualization is commonly referred to as a hypervisor and is also known as a virtual machine monitor (VMM). The hypervisor emulates the underlying hardware of the host computer, making the use of the virtual machine transparent to the guest operating system.

During the last years a number of developments have been conceived to increase the efficiency of the virtual machines which are hosted on a host. For example, U.S Patent Application No. 2010/0306173 describes a method and system for handling temporary data of a virtual machine are described. In one embodiment, virtual machines are hosted by a server and accessed by remote clients over a network. The server assigns first storage and second storage to each virtual machine, where the first storage is designated for temporary data of a respective virtual machine and the second storage is designated for persistent data of a respective virtual machine. The server monitors events pertaining to the virtual machine. Upon detecting a predefined event pertaining to one of the virtual machines, the server causes at least a subset of the temporary data to be removed from the first storage of this virtual machine.

SUMMARY OF THE INVENTION

According to some embodiments of the present invention there is provided a method of managing at least one resource allocated to a plurality of guest virtual machines. The method comprises executing a plurality of guest virtual machines in a host platform managing at least one resource, allocating the at least one resource among the plurality of guest virtual machines, separately collecting, from each guest virtual machine, resource usage data by locally monitoring at least one of an operating system operation, an executed procedure, and an executed thread in each the guest virtual machine, gathering the resource usage data from each the guest virtual machine, and reallocating the at least one resource among the plurality of guest virtual machines according to an analysis of the gathered resource usage data from the plurality of guest virtual machines.

Optionally, the gathering is performed in a plurality of sampling periods, the reallocating comprising performing a statistical analysis of the resource usage data from each the guest virtual machine and reallocating the at least one resource among the plurality of guest virtual machines according to the statistical analysis.

Optionally, the reallocating is performed by instructing a basic input output system (BIOS) of at least one of the plurality of guest virtual machines to change local allocation of at least one virtual resource.

Optionally, the reallocating is performed by instructing a guest operating system of at least one of the plurality of guest virtual machines to change local allocation of at least one virtual resource.

Optionally, the reallocating is performed by instructing at least one driver separately executed by at least one of the plurality of guest virtual machines to change local allocation of at least one virtual resource at the at least one guest virtual machine.

Optionally, the resource usage data comprises at least one of a deficiency and an excess of the at least one resource in a respective the guest virtual machine.

Optionally, the reallocating is performed without a shutdown or a halt of an operating system which is responsible for the allocation of resources to procedures in any of the plurality of guest virtual machines.

Optionally, the method further comprises monitoring the availability of the at least one resource at the host platform; wherein the reallocating is performed according to the monitoring.

Optionally, the reallocating is performed by sending at least one hardware interrupt to a basic input output system (BIOS) or a driver of at least one of the plurality of guest virtual machines.

Optionally, the monitoring comprises monitoring a member of a group consisting of a kernel process, a kernel thread, a scheduling application, and kernel accessible application, the member being executed at least one of the plurality of guest virtual machines.

Optionally, the reallocating comprises calculating a cumulative contribution of a plurality of resource allocations according to the analysis, selecting one of the plurality of resource allocations according to the calculating, and performing the reallocating according to the selecting.

Optionally, the method is implemented by a module executed on a virtualization layer of the host platform.

Optionally, monitoring is performed by monitoring process scheduling of an operating system managing the at least one locally executed procedure in each the guest virtual machine.

According to some embodiments of the present invention there is provided a host platform for hosting a plurality of guest virtual machines and managing at least one resource allocated thereto. The host platform comprises a memory for hosting a plurality of guest virtual machines, a plurality of monitoring modules each installed to collect resource usage data by locally monitoring at least one of an operating system operation, an executed procedure, and an executed thread in one of the plurality of guest virtual machines, at least one resource, and a host controller which communicates with each the monitoring module to reallocate the at least one resource among the plurality of guest virtual machines according to an analysis of the collected resource usage data.

Optionally, each the monitoring module estimates a desired change in the allocating the at least one resource to a respective the hosting guest virtual machine according to the resource usage data and forwards a request to the host controller accordingly.

Optionally, the plurality of monitoring modules are installed in the user mode level of the operating system of the plurality of guest virtual machines.

Optionally, each the monitoring module is configured to update the basic input output system (BIOS) of the hosting the guest virtual machine.

Optionally, each the monitoring module is configured to communicate with at least one driver executed on the hosting the guest virtual machine.

Optionally, the host controller communicates with each the monitoring module via a connection channel with a guest operating system of a respective of the plurality of guest virtual machines.

Optionally, the monitors the availability of the at least one resource, and reallocates the at least one resource according to the monitoring.

Optionally, the at least one resource comprises a member of a group consisting of: a central processing unit, a random access memory (RAM), a non-uniform memory architecture (NUMA) node, and a peripheral component interconnect (PCI) card.

Optionally, the host controller calculates a report summarizing statistic resource usage data of at least some of the guest virtual machines based on the analysis.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to virtualization and, more particularly, but not exclusively, to methods and systems of managing resources allocated to guest virtual machines.

According to some embodiments of the present invention, there is provided a system and a method of managing one or more shared resources, such as computing power, memory resources, network access resources and the like, which are allocated at a host platform to a plurality of guest virtual machines, according to resource usage data which is locally collected and/or monitored at each one of them. The resource usage data includes, for example, scheduling data and/or procedures and/or threads which are managed by the operating systems of the guest virtual machines. The resource usage data is optionally collected by monitoring modules, which are installed in each one of the guest virtual machines. Each one of the monitoring module monitors, locally, operating system operations and/or procedures, the basic input output system (BIOS) operations and/or procedures, and/or the driver operations and/or procedures of a hosting guest virtual machine. The resource usage data from the guest virtual machines is optionally sent to a host controller that manages the allocation of the one or more resources. Optionally, the host controller gathers information regarding the resources from the virtualization layer of the host platform, for example availability of statistical usage data.

According to some embodiments of the present invention, a method of managing shares of a plurality of guest virtual machines is provided. First, the shared resources are allocated among a plurality of guest virtual machines in a host platform. Then, resource usage data is separately collected from each guest virtual machine, by monitoring one or more locally executed procedure or threads in guest virtual machine or by monitoring operating system operations, such as scheduling. This allows gathering the resource usage data from each guest virtual machine and reallocating the resources among the guest virtual machines according to an analysis of the gathered resource usage data from the guest virtual machines, optionally at the virtualization layer.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
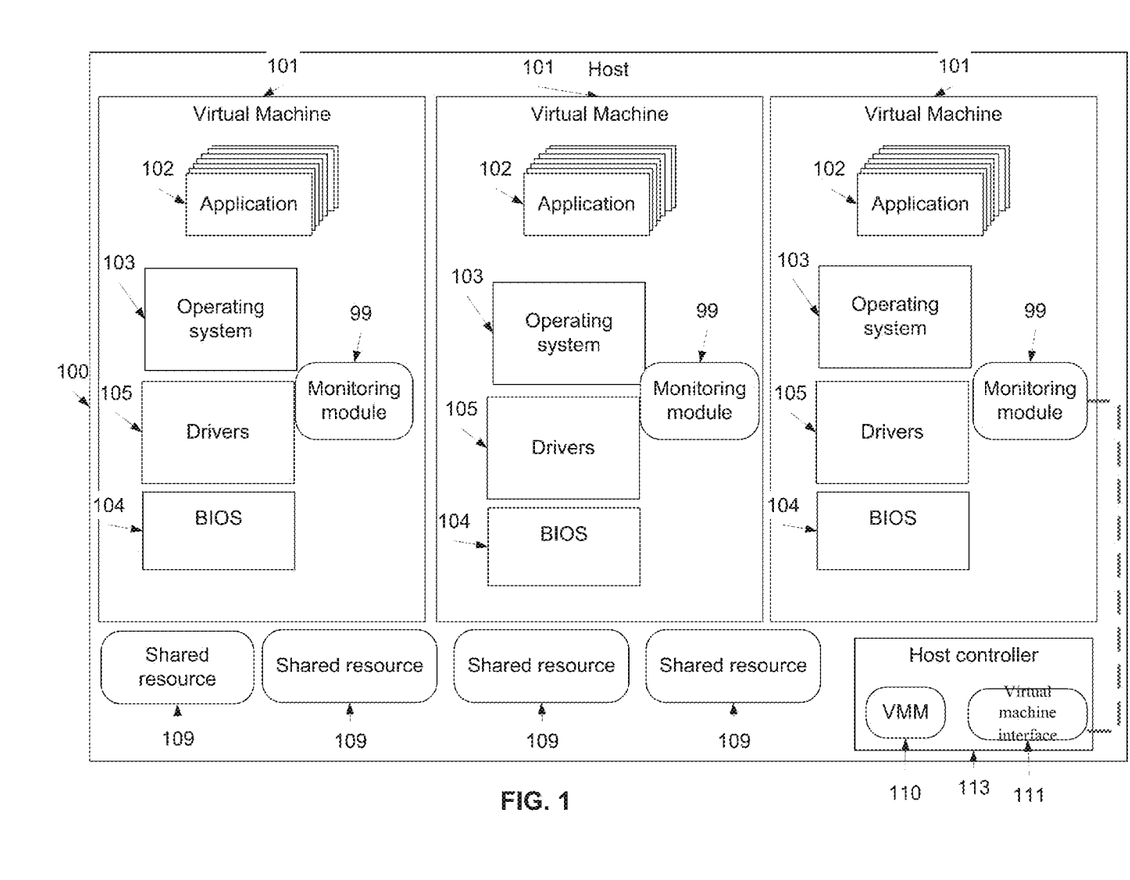
FIG. 1 is a schematic illustration of a host platform for hosting guest virtual machines and managing resources, such as memory, computing power, and network access which are allocated thereto, according to some embodiments of the present invention.

Reference is now made to FIG. 1, which is a schematic illustration of a host platform 100 for hosting a plurality of guest virtual machines 101 and managing one or more resources 109, such as memory, computing power, and network access which are allocated thereto, according to some embodiments of the present invention. The host platform 100 is optionally connected via a network to a plurality of clients. The network may be a local area network (LAN), a wide area network (WAN), intranet, and the Internet. The clients may be network nodes which communicate with the host platform 100 via the network, for example computing units, such as desktops, laptops, personal digital assistants, Smartphones, tables and thin clients. The host platform 100 includes one or more servers which host the guest virtual machines 101. Optionally, each virtual machine 101 separately and independently executes and manages one or more applications 102.

Each virtual machine 101 runs a guest operating system (OS) 103, for example Microsoft Windows, Linux™, Solaris, Mac OS, and the like. For clarity, the guest OS 103 is the OS which is responsible for the allocation of resources to procedures in the virtual machine 101. The host platform 100 includes or connected to a host controller 113 (via a network or directly). The host controller 113 includes a virtual machine monitor (VMM) 110, also known as hypervisor, which presents to the guest operating systems a virtual operating platform and monitors the execution of the guest operating systems. The virtual operating platform allows multiple instances of a variety of guest operating systems to share the virtualized hardware resources 109. The host controller 113, for example using the VMM, allocates the resources 109 among the virtual machines 101. The resources 109 may be memory resources, for example the memory space that is allocated per virtual machine 101, computing resources, for example the computer power.

Each one of the guest virtual machines 101 includes one or more monitoring modules 99. These monitoring modules 99 optionally monitor resource usage data of the hosting virtual machine, for example procedures and/or internal request for resources which are locally executed and/or issued by the monitoring modules 99, for example as described below. Optionally, the monitoring modules 99 communicate with the components of the guest virtual machines 101, for example OS, BIOS, and or drivers, for adding and/or removing virtual resources which are allocated thereto, for example as described below. The host controller 113 includes a virtual machine interface module 111 that communicates with the monitoring modules 99. The virtual machine interface module 111, which is located at and executed with a virtualization layer, is either a separate application or a module integrated into a virtualization engine.

Optionally, in runtime, the monitoring modules 99 forward the collected resource usage data and/or an analysis thereof to the virtual machine interface module 111. This allows, as further described below, to reallocate the resources among the plurality of guest virtual machines 101.

The virtual machine interface module 111 optionally handles the addition and/or removal of virtual resources from the virtual guests 101. To perform addition and/or removal of virtual resources, the virtual machine interface module 111 updates the virtualization layer using a standard application program interface (API) that is exported by the virtualization layer. Optionally, if such a standard API does not exist, the virtual machine interface module 111 uses other operations to perform the addition and the removal mentioned above. For example, the virtual machine interface module 111 modifies the internal data structures in the VMM 110 to reflect the desired changes in the configuration of the virtual guests 101. Alternatively, the VMM is modified to perform the addition and the removal mentioned above. In addition, the virtual machine interface module 111 also communicates with the monitoring modules 99 to update the virtual resources which are managed by the Guest OS 103. In such a manner, the monitoring modules 99 may be instructed to change the virtual resources which are used by the respective Guest OSs 103, for example to remove and/or to add a resource, such as a memory block and/or a computing unit, from the virtual resources which are used by the Guest OS 103. The communication between the monitoring modules 99 and the virtual machine interface module 111 may be performed using a 'backdoor' protocol provided by the VMM 110, such as the 'VX' port used by VMware™, so that the communications between the guest OS 103 and the monitoring modules 99 are performed within the VMM 110 itself. Additionally or alternatively a standard network interface provided inside the guest OS 103 may be used for facilitating a communication over the network layer, for example IP and/or InfiniBand based communication.

Figure 2:
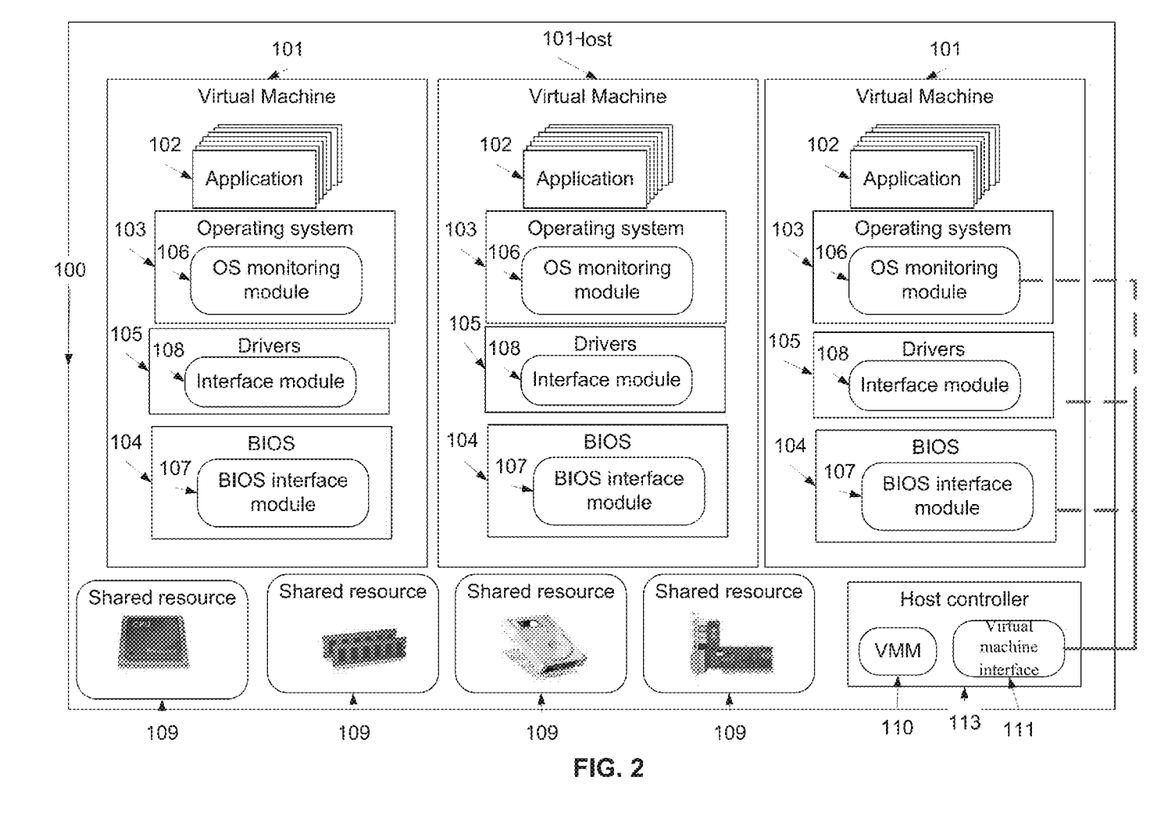
FIG. 2 is a schematic illustration of the host platform of FIG. 1 where a number of optional monitoring modules are installed in each guest virtual machine, according to some embodiments of the present invention.

Reference is now also made to FIG. 2, which is a schematic illustration of an exemplary implementation of the host platform depicted in FIG. 1 where a number of different monitoring modules are installed in each one of the guest virtual machines 101, according to some embodiments of the present invention. Optionally, the monitoring modules which are installed in a certain guest virtual machine 101 includes an OS monitoring module 106 which communicates, optionally directly, with the guest OS 103. Additionally or alternately, the monitoring modules, which are installed in a certain guest virtual machine 101, includes a BIOS interface module 107 which communicates, optionally directly, with the virtual BIOS 104. Additionally or alternately, the monitoring modules, which are installed in a certain guest virtual machine 101, includes a driver interface module 108 which communicates, optionally directly, with the virtual drivers 105.

The virtual machine interface module 111 communicates with the interface BIOS modules 107 by invoking virtual hardware interrupts on the respective virtual guests 101. The virtual hardware interrupts indicate the required addition or removal of virtual resources, which are to be added to and/or removed from the virtual guest 101. Each BIOS interface module 107 intercepts the interrupts, performs respective operations inside the BIOS 104, and notifies the guest operating system 103 about the respective operations. For example, once a resource, such as a new virtual memory block, has been allocated by the virtual machine interface module 111, it is attached to the virtual guest 101 and the BIOS interface module 107 notifies the guest operating system 103 asserting a notification into the advanced configuration and power interface (ACPI) device in the BIOS which handles memory operations, for example the 'PNP0C80'. For example, an ACPI interrupt named PNP0C80 is called. The guest OS 103, which optionally supports ACPI, detects this change. For example, Linux™ OS detects the change and runs an appropriate udev script to add the new memory block into the guest OS 103. If the guest OS does not support ACPI, the OS monitoring modules 106 and optionally the driver interface module 108 perform the change using OS APIs. Other operations may be performed similarly, where the type of the virtual resource which is allocated or released and the name of the ACPI interrupt are changed.

The virtual machine interface module 111 communicates with the OS monitoring modules 106 by a communication with the Guest OS 103. The communication may be done by any transport that is available for the guest OS 103, for example transmission control protocol internet protocol (TCP/IP) messages, internal host-guest transport, and/or any other transport that is able to communicate command messages. The virtual machine interface module 111 notifies the OS monitoring modules 106 of any required additions and removals of virtual memory. In addition, the virtual machine interface module 111 optionally monitors the resource usage of virtual machines 101 using an API that is provided by the virtualization layer. The virtual machine interface module 111 aggregates the collected resource usage data which consists of one or more of the following:

1. CPU performance information—for example information about threads which are performed by the CPU, such as the amount of working, sleeping, and/or suspended threads, the amount of context switches and the amount of time spent in handling kernel threads and/or kernel interrupts.

2. Memory usage—for example information about the allocation of memory on the guest virtual machine 101, such as information about the distribution of allocated memory inside the virtual guest 101, for instance how many pages are allocated in the kernel (in the paged and/or in the non-paged memory pools), how many pages are allocated in the user-mode space, the amount of page faults, and/or the amount of pages mapped to files or I/O devices.

3. Internal operating system data—this data is a derivative of the operations of the virtual guest 101.

4. Any data that is documented by the guest OS 103.

Optionally, in runtime, the virtual machine interface module 111 collects data from the virtualization layer that is managed by the host controller 113. For example, the collected data includes the distribution of any of the shared resources 109 on the host platform 100, the resource distribution of any of the shared resources 109 among the guest virtual machines 101, the availability of any of the shared resources 109, and/or any data which the virtualization layer may provide.

The collection of data from the virtualization layer and the monitoring modules 99, in runtime, allows the virtual machine interface module 111 to calculate a desired distribution of each one of the shared resources 109. This allows the virtual machine interface module 111 to reallocate resources among the virtual guests 101, for example by sending instructions to the monitoring modules 99 as outlined above and described below. For example, the reallocation is done when the virtual machine interface module 111 notifies the virtual guests 101, via the monitoring modules 99, as of which operations they are required to take. The communication between the monitoring modules 99 and the virtual machine interface module 111 allows the virtual machine interface module 111 to monitor the implementation of the required operations. For example, the virtual machine interface module 111 calculates the progress of the implementation of the required operations and matches it to a current desired distribution.

According to some embodiments of the present invention, the virtual machine interface module 111 manages the activity of the virtual guests 101 according to the current and the future availability of the shared resources 109. For example, the virtual machine interface module 111 communicates with a presentation unit, such as a display and/or an interface, such as a network interface card, to alert the operator of the host platform 100, for example when one or more of the shared resources 109 are exhausted or about to be exhausted. The alert may be displayed on a screen, sent as a message to a desired terminal, for example as an email and/or a short message service (SMS) message, and/or otherwise outputted to notify the operator. Optionally, the virtual machine interface module 111 instructs the migration of one or more virtual guests 101 to another host platform 100, for example when one or more of the shared resources 109 are exhausted or about to be exhausted, or when a malfunction is detected in one of the shared resources 109. Optionally, the virtual machine interface module 111 puts one or more of the virtual guests 101 on hold when one or more of the shared resources 109 are exhausted or about to be exhausted or when a malfunction is detected in one of the shared resources 109.

Optionally, the virtual machine interface module 111 shuts down one or more of the virtual guests 101 when one or more of the shared resources 109 are exhausted or about to be exhausted or when a malfunction is detected in one of the shared resources 109.

According to some embodiments of the present invention, the virtual machine interface module 111 records the data from the virtualization layer and/or the data collected from the monitoring modules 99 in a log. This allows the virtual machine interface module 111 to analyze, statistically, the run-time requirements of each one of the virtual guests 101. The output of the statistical analysis may be used to produce a report describing the consolidation ratio on the host during a period and for calculating a support data or a recommendation regarding the optimal configuration of virtual guests on that the host platform 100. The data may include information about the consumption of virtual resources, such the CPU, the memory, and/or any other virtualized resource, on any of the virtual guest 101 over a specified period.

As depicted in FIG. 2, the monitoring modules 99 which are installed in each virtual guest 101 may include a BIOS interface module 107 that provides the support required by the guest OS 103 for addition and removal of virtualized hardware resources. The BIOS interface module 107 optionally modifies the BIOS SSDT tables in a manner that allows the addition and removal of resources, such as central processing units, random access memory (RAM), non-uniform memory architecture (NUMA) nodes, and/or PCI cards, without requiring a shutdown or a halt of the guest OS 103. In use, the BIOS interface module 107 hooks and/or intercepts interrupts which indicate necessary addition or removal of hardware at the respective virtual guest 101. The interrupts may be originated from other monitoring modules, such as the OS monitoring module 106, from the virtual machine interface module 111 and/or form another source which requests changes in the virtual hardware of the respective virtual guest 101, for example manual changes in the configuration of a running virtual guest 101 through the virtualization layer.

The BIOS interface module 107 is set to instruct the hosting BIOS 104 to add and/or remove hardware during runtime, for example in a standard manner. The BIOS interface module 107, communicates, optionally by emulating the hosting BIOS 104, with the guest OS 103. This communication includes an update regarding the status of the added and/or removed hardware.

It should be noted that as the standard for modifying a configuration of a system during run time is not defined in a standard, there may be a need to have variations of this module for use with different guest operating systems. One example of a different variation of the implementation for different operating systems is having slightly different ACPI BIOS SSDT tables to represent different CPUs, since Windows™ and Linux™™ expect a slightly different structure of the tables to operate properly.

As depicted in FIG. 2, the monitoring modules 99, which are installed in each virtual guest 101, may include a driver interface module 108 that provides the support for adding or removing resources, such as central processing units, memory, NUMA nodes, PCI cards, NICs and memory controllers, in runtime, without requiring a system to be halt or shutdown. Optionally, when the operations for adding and/or removing resources on runtime is performed by one or more existing modules, the driver interface module 108 wraps these modules with a standard interface accessible to the virtual machine interface module 111 and/or other monitoring modules 99.

Optionally, the driver interface module 108 communicates with the BIOS interface module 107 by issuing hardware interrupts, such as driver interrupts, which are intercepted by the BIOS 104. In such a manner, required changes to the hardware configuration of the hosting virtual guest 101 may be notified. The driver interface module 108 performs required tasks at the operating system level to ensure the prompt execution of such notifications. When the guest OS 103 does not support the ACPI standard, and therefore cannot interpret ACPI interrupts, the driver interface module 108 performs the link between the interrupt and the work required by the guest OS to add the new resource. The driver interface module 108 assures that changes to the OS are valid in order to prevent errors. For example, when the resource is memory, the allocated RAM is changed to less than the amount needed currently for the guest OS 103 to function properly (less than the amount allocated inside the non-paged memory in the kernel for example). For example, when the resource is CPU, the removal of the last running CPU (leaving the guest with 0 CPUs) is avoided.

As used in this document, the term "standard" is used to describe one or more common known operations for communicating with virtual guests in host platforms. An exemplary standard is as documented within the Linux™ OS specification to support hotplugs of CPU and/or RAM. Optionally, the driver interface module 108 communicates with the OS monitoring module 106, for example delivers information about the hardware configuration of the virtual guest. The notifications are made as soon as possible, to allow the OS monitoring module 106 to adapt to the upcoming changes.

The driver interface module 108 monitors kernel processes, kernel threads, scheduling information, and/or information which is accessible within the kernel of the hosting virtual guest 101. Such information, which is usually not available at the OS level, allows collecting more resource usage data about the hosting virtual guest 101.

The driver interface module 108 optionally passes the collected data to the virtual machine interface module 111 and/or the OS monitoring module 106 for processing. The driver interface module 108 is optionally adapted to the guest OS 103 in order to keep it compatible with different versions of operating systems.

As depicted in FIG. 2, the monitoring modules 99, which are installed in each virtual guest 101, may include an OS monitoring module 106 that optionally collects and aggregates resource usage data that is accessible from within a user-mode level of the OS. The collected data may be aggregated by the OS monitoring module 106 or any other monitoring module 99. The resource usage data may consist of information about user-mode processes and threads, information about memory allocation, and/or any other data that is accessible to a user-mode application in the guest OS 103.

Optionally, the OS monitoring module 106 collects aggregates and analyzes resource usage data to create a desired virtual resource demand for the virtual guest 101. The desired virtual resource demand optimizes resource allocation of the entire virtual host.

Optionally, the resource usage data is collected during a sample period. For example, the resource usage data includes CPU related information, for example working threads (optionally system-wide). The output of analysis of such data includes a CPU set indication that is indicative of computing power required by the guest OS 103. In another example, the resource usage data includes memory related information, for example data regarding distribution of the memory allocations (optionally system-wide). The output of analysis of such data includes a memory set that is required by the guest OS 103. The analysis optionally includes an analysis of general OS performance data, such as input/output (I/O) statistics and/or OS parameters. The analysis also includes calculating information about the robustness of the guest OS 103. It should be noted that the analysis that is described herein as performed by the OS monitoring module 106 may be performed by any other module in the guest OS 103 and/or by the virtual machine interface module 111.

According to some embodiments of the present invention, the monitoring module 99, for example the OS monitoring module 106, locally instructs a change in the configuration of the virtual guest 103 so as to satisfy a resource demand. Such a request may result in a sudden request for a resource that is sent to the host 113, such as computing power and storage space.

Optionally, the OS monitoring module 106 is set to present a graphical user interface (GUI) that displays status information regarding the resource usage data to a user of the hosting virtual guest 101. The status information may include logs, alerts, and/or status icons related to aspects of resource allocation to the guest operating system.

Figure 3:
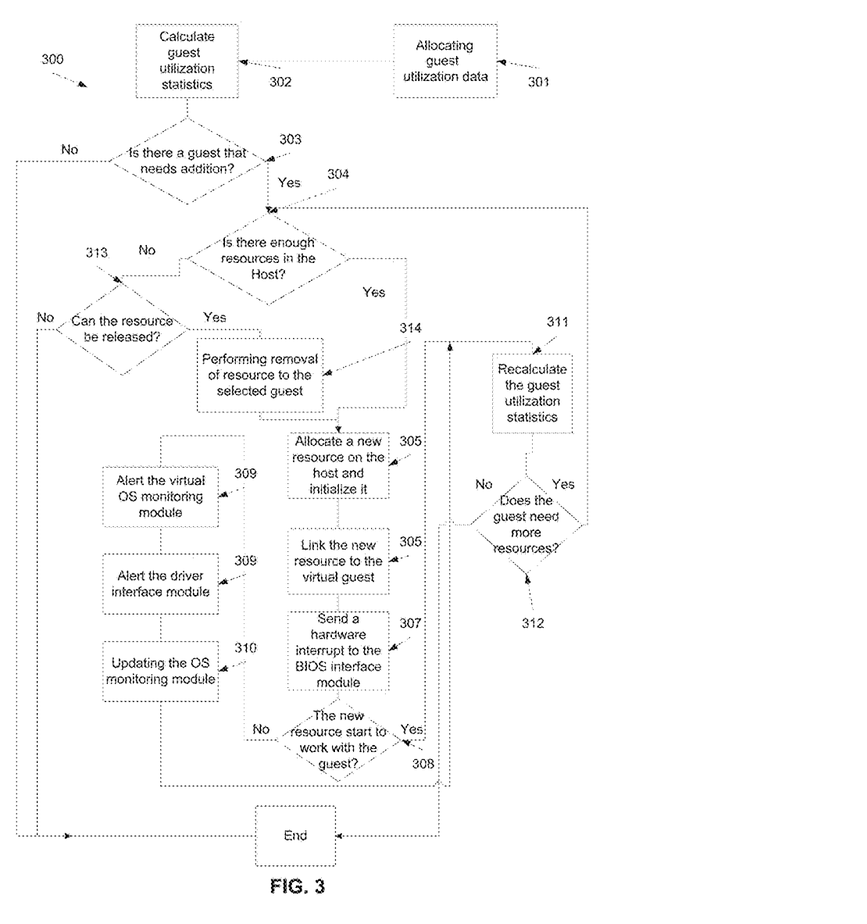
FIG. 3 is a flowchart of a process for adding a virtual resource to a hosting virtual guest, according to some embodiments of the present invention.

Reference is now also made to FIG. 3, which is a flowchart 300 of a process for adding a virtual resource to a hosting virtual guest, such as 101, based on the analysis of resource usage data and optionally virtualization layer data, according to some embodiments of the present invention. The process depicted in the flowchart 300 may be repeated iteratively any number of times for various periods, for example as long as virtual guests, such as 101, are hosted.

First, as shown at 301, resource usage data and optionally virtualization layer data are collected by the monitoring modules 99 and/or the virtual machine interface module 111. This data may be continuously connected or during sampling periods.

Now, statistical data regarding the utilization of resources may be calculated, as shown at 302. This allows, as shown at

303, determining whether the amount of allocated resource is sufficient or insufficient. For example, statistical data which is indicative of redundant or absence CPU allocation may be collected by monitoring the amount of threads in runtime and/or the amount of required processing power as calculated during a sample period. Indications for absence of CPU allocation include more working threads than processing units, exhaustion of existing processing resources, and/or high hardware interrupt rate.

Optionally, a need for an addition of a resource is detected when the analysis detects exhaustion, or future exhaustion, of the resource and shows that the addition of resources improves the performance of the guest OS 103. For example, exhaustion of memory may be detected when an estimation of RAM availability which is needed to guarantee that the OS would never enter out of memory (OOM) mode for the current workload is less than the currently allocated RAM. In another example the exhaustion of computing power, CPU, is detected when the amount of working usermode threads over a long sample period is more than the amount of available virtual CPUs.

Optionally, the determination whether the amount of allocated resource is sufficient or insufficient is taken by the virtual machine interface module 111 at the virtualization layer. The virtual machine interface module 111 detects a need to add processing power, for example a processing unit, to a specific virtual guest 101 by analyzing the work amount of each one of the virtual guests 101 and considering free resources which are still available on the host. The virtualization layer may then decide to add a processing unit to the guest OS 103 of one of the virtual guests 101. In such a manner, the virtualization layer balances resource allocation across virtual guests 101, and makes changes which do not only depend on demands of virtual guests 101, but also on the availability of resources on the host platform 100.

When the OS monitoring module 106 detects a demand for an additional resource, such as an additional processing unit, it communicates with the virtual machine interface module 111 to verify that it is possible to allocate more of the deficient resource, for example more processing power. As the OS monitoring module 106 has a local view of the current virtual guest 101 it can promptly detect a demand for a resource and changes in the demand. This is different from the indirect point of view of monitoring the demand from the virtualization layer. The addition of a resource, such as a processing unit, may be done at any time the host platform 100 provides resources and one of the virtual guests 101 may improve its performance if an additional resource is allocated thereto. As shown at 304, resources are allocated based on availability, for example according to the host controller 113.

For example, the virtual machine interface module 111 determines the availability of resources at the platform host 100 for a certain virtual guest by calculating the current amount of virtual guests 103, the current amount of processing units allocated to the certain virtual guest, the amount of free memory at the platform host 100, the current workload at the platform host 100, and whether the certain virtual guest 103 can receive more processing units.

As shown at 305, resources are allocated on the platform host 100 by the virtual machine interface module 111 at the virtualization layer. As shown at 306, the new allocated resource, for example a new processing unit, is linked to the virtual guest 103. Once the virtual resource is ready to be allocated and the virtual guest 103 is ready to receive the resource, the virtualization layer links the virtual resource into the virtual guest 103 so that the virtual guest 103 is able to start working with the newly allocated resource.

Optionally, in order to notify the virtual guest 103 about the allocation, as shown at 307, a hardware interrupt that is defined to be intercepted by the BIOS interface module 107 is sent. The hardware interrupt is optionally a 'standard' interrupt that is set to notify the virtual hardware regarding a new resource, such as processing unit. For clarity, it should be noted that a new process may be part of a resource.

Optionally, as shown at 308, if the new resource is not accessed or used by the virtual guest 103, an alert about a new resource, such as a new processing unit, is sent to the virtual guest 103. This forces the respective guest OS 103 to start working with the newly allocated resource. For example, the forcing assures that the guest OS 103 performs internal steps needed to initialize the resource, such as running a script on the virtual guest 103 which process the interrupt which informs the guest OS 103 about the new hardware and calls the appropriate OS API to register the new hardware within the guest OS 103 and/or add the resource to an allocation mechanism, for example a processing unit to a task scheduling process. Optionally, as shown at 309, the alerting is performed via the OS monitoring module 106, which uses an OS API and/or the driver interface module 108 to add the resource to the guest OS 103, as shown at 310.

Now, as shown at 311, new statistical data is recalculated based on the new virtual hardware configuration. As shown at 312, this analysis may be reexecuted using the new configuration of the host platform 100 to determine whether more changes to the configuration should be done.

During this process the OS monitoring module 106 optionally verifies that enough free resources are available by communicating with the virtual machine interface module 111 and prepares the guest OS 103 for the addition of a new resource, such as one or more processing units.

As depicted by numerals 313, 314, the resources may be removed from other virtual guests in order reallocate them to the certain virtual guest 103 that is in need of them.

The process depicted in the flowchart 300 may be used for the addition of a memory resource, for example when the analysis detects an exhaustion of existing memory resources and shows that the addition of more memory will improve the performance of the guest operating system. The analysis is based on the amount of consumed memory in the guest, the distribution of the allocation on the guest, non-paged, paged, committed, and/or any other memory allocation types on the operating system, and the amount of free memory on the host. The analysis allows finding whether additional memory improves the performance of the guest OS 103. Considerations for adding additional memory include: paging of memory on the virtual guest 101, the amount of required memory that is needed to satisfy allocations than existing OS analysis resulting in request for more memory.

A request to allocate more memory resources may be originated from the virtualization layer, for example from the virtual machine interface module 111. In such an embodiment, the virtual machine interface module 111 analyzes the memory load of each virtual guest 103 and considers releasing memory resources which are available on the host platform 100. Adding resources may be done to reallocate resources to balance resources across the virtual guests 101 so as to make changes which do not depend on demands of virtual guests 101 but also on available resources on the host platform 100.

Figure 4:
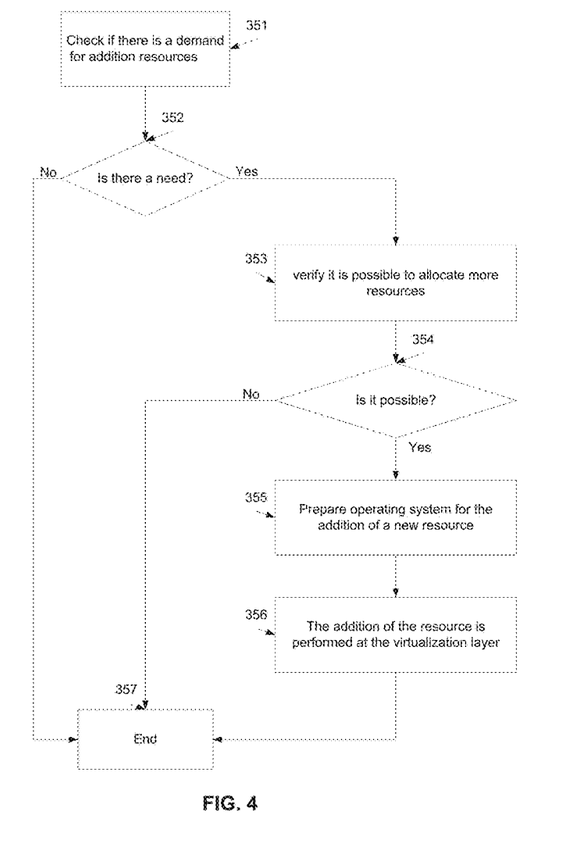
FIG. 4 is a flowchart of a process which is implemented by a monitoring module to add resources to a hosting virtual guest, according to some embodiments of the present invention.

A request to allocate more memory resources may be originated from the virtual guest itself, for example from the OS monitoring module 106, which may detect more sudden and immediate demand for additional memory. The OS monitoring module 106 communicates with the virtual machine interface module 111 to verify that it is possible to allocate more memory resources. For example, FIG. 4 depicts a flowchart of a process that is implemented by the OS monitoring module 106 to add resources to the hosting virtual guest 103, according to some embodiments of the present invention. As shown at 352, 352, the OS monitoring module 106 monitors and detects when there is a demand for an additional resource. Then, as shown at 353, 354 the OS monitoring module 106 verifies with the virtual machine interface module 111 if more respective resources are available. If so, the guest OS 103 is prepared and the resource is added, with coordination with the virtual machine interface module 111, as shown at 355, 256. If no resources are available, this process ends, as shown at 357. The process may be repeated any number of times when the virtual guest 101 is hosted and executed on the host platform 100.

The OS monitoring module 106 is optionally set to verify that enough free resources are available by communicating with the virtual machine interface module 111 and updates the respective guest OS 103 about the addition of a new memory block.

Figure 5:
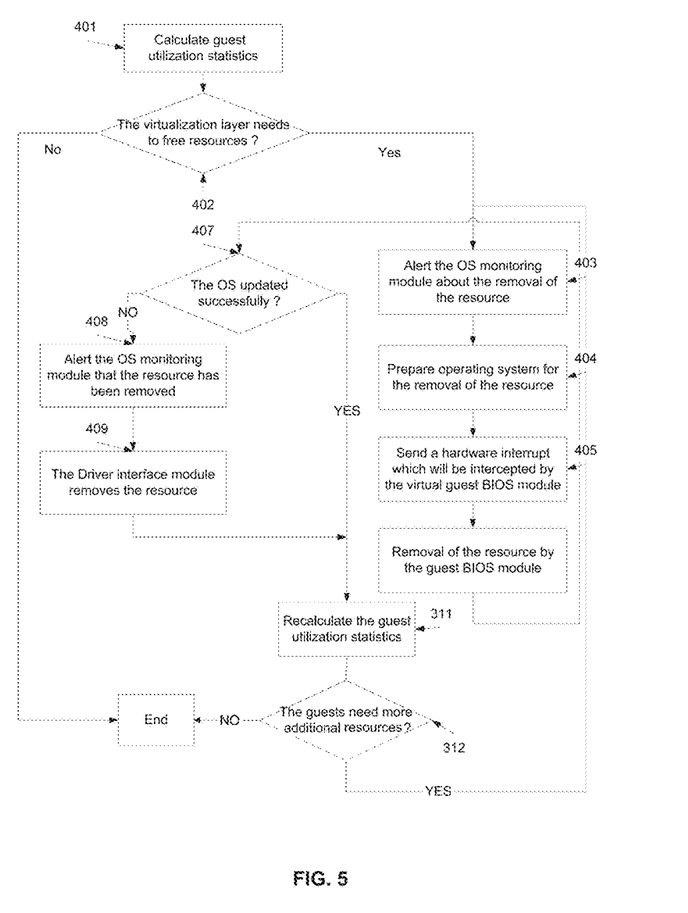
FIG. 5 is a flowchart of a process for releasing resources and reallocating them, according to some embodiments of the present invention.

Reference is now made to FIG. 5, which is a flowchart of a process for releasing resources and reallocating them, according to some embodiments of the present invention. This process may occur when the virtual machine interface module 111 detects that removing or reallocating a resource, which is reserved to a currently hosting virtual guest 101, has a higher cumulative contribution to the clients of the virtual guests 101 than allocating this resource to the currently hosting virtual guest 101. Removing of a resource, such as a CPU, releases processing and/or memory resources on the platform host 100 and therefore enables the platform host 100 to reallocate them.

First, as shown at 401, statistical data regarding the resources is gathered, for example as described above. Now, as shown at 402, the virtual machine interface module 111 determines whether a removal of resources is needed. The determination that resources, such as processing units, should be removed is performed when the host platform 100 exhausts the resources and detects that such removal frees resources that could be used by virtual guests in a manner that improves the consolidation ratio. The removal of resources is optionally performed at the virtualization layer, by the virtual machine interface module 111. The virtualization layer module has an overview of the host and its virtual guests, and should analyze the amount of free resources it has and keep a reserve set for spikes in demand. When the reserve is below a set threshold only then processing units may be removed from virtual guests and either reallocated or deleted.

Optionally, the virtual machine interface module 111 determines that a removal of a resource, such as a virtual processing unit, from a virtual guest, improves the overall performance of the host platform 100 and its virtual guests 101 based on the memory and the processing resources which are consumed by one or more of the virtual guests 101. Optionally, a set of weights is used during the determination whether the removal improves the overall system performance. An example of a case in which a removal of a virtual CPU from a guest OS improves performance on the host itself is when the host has allocated with more virtual CPUs than the amount of physical CPUs it has. Once it happens, the performance on the host degrades as more virtual CPUs are added. Removing a virtual CPU from one of the virtual guests 101, in this case, improves the performance of host platform 100.

In use, the OS guest module 106 is alerted about the upcoming removal of a resource. As shown at, 404, the OS monitoring module 106 is signaled to attempt to stop all processes on the CPU that are about to be removed. In such a manner, errors which may cause a system fault inside the guest OS 103 are prevented or reduced dramatically. The OS monitoring module 106 removes resources, such as a CPU, from the task scheduler, so that related process interrupts are not processed. If the guest OS 103 has not being updated, the OS monitoring module is alerted, as shown at 407, 408. Optionally, the following steps are performed to ensure that the guest OS performs internal steps needed to remove the resource: First, as shown at 405, one or more hardware interrupts, which are set to be intercepted by the BIOS interface module 107, are sent. Optionally, theses are 'standard' interrupts which notify the virtual hardware of the removal of a resource, such as a computing unit. For example, when the guest OS is a Linux™ OS, computing resources may be removed as follow:

1. CPU_DOWN_PREPARE notification event is transmitted to one of the monitoring modules which 99.
2. Processes are migrated away from the CPU resource which is about to be removed to other CPUs which are marked as available in the processes.
3. Interrupts are migrated away from the CPU resource which is about to be removed to another available CPU.
4. Kernel objects, such as timers, tasks, bottom halves, and the like are migrated away from the CPU to any other available CPU.
5. Appropriate architectural (x86/AMD64/IA64) APIs are called to offline the CPU resource which is about to be removed. This is where the ACPI BIOS interrupts are made. The name and type of the interrupts and operations depends on the architecture in question.
6. CPU_DEAD notification event is sent to the monitoring module 99 to indicate that the CPU has been removed. When the OS monitoring module is alerted, as shown at 408 it may instruct the Driver interface module 108 to remove the resource.
7. The OS monitoring module 106 is notified that a resource, such as a processing unit, has been removed. This may be performed when the guest OS 103 does not support logical remove of resources. In such an embodiment, memory pages may be migrated out of a memory block that is about to be released as the guest OS 103 cannot do it itself. The OS monitoring module 106 uses an OS API and optionally instructs the driver interface module 108 to remove the resource, for example the processing unit, from the operating system. The resource is optionally unlinked from the virtual guest 101. Once the virtual resource is unlinked, and not performing any tasks, the virtualization layer may delete the resource, for example the virtually allocated processing unit. This action releases resources consumed by the virtual resource on the host platform 100 and may improve the performance of the system.

The removed resource is optionally allocated to a designated virtual guest 101 which requires an additional respective resource, such as more processing power. Optionally, previous configuration of the resource is used for the reallocation. For example, when the resource is a processing unit, the internal structures thereof have been allocated and initialized and therefore the addition thereof to a new virtual guest 103 may skip these actions which may be done to balance resources between virtual guests, when the host itself attempts to keep a reserve for the addition of more virtual resources. Blocks 311 and 312 are as described above.

The process depicted in the flowchart 400 may be used for the removal of a memory resource, for example when the analysis detects that the usage of a certain memory resource, such a memory block, by one of the virtual guests 101, is less efficient to the total throughput of the platform host than reallocating to another virtual guest 103. Optionally, memory resource removal is managed by the virtual machine interface module 111 according to the amount of free memory resources at the host platform 100.

Optionally, the virtual machine interface module 111 gather statistical data about the demand for the memory resources and/or receives estimation about the need for memory resources. In such a manner, the virtual machine interface module 111 may calculate the amount of free resources it has to reserve for future increases in demand (spikes). When the reserved memory resources are below a set threshold, the virtual machine interface module 111 may instruct releasing memory blocks from virtual guests 101.

In use, the OS monitoring module is signaled to stop all usage in the memory resource, which is about to be reallocated or deleted, and to migrate data stored in the memory resource which is about to be removed to prevent errors inside the guest OS 103. The memory block should be removed from the memory manager. Optionally, the driver module 108 sends a hardware interrupt, optionally a standard interrupt, to be intercepted by the BIOS interface module 107 to notify the virtual hardware of the removal of a memory block. Optionally, the interrupt is not generated according to a certain standard and the process herein is similar to the one currently used by Linux™ for removing memory blocks. For example, the ACPI Interrupt PNP0C80 is used to add and/or remove memory blocks which are defined in the BIOS SSDT.

Optionally, the OS monitoring module 106 alerts the guest OS 103 about the new virtual hardware configuration. Optionally, the OS monitoring module 106 uses an OS API and the driver interface module 108 to remove the memory resources from the guest OS 103. Optionally, the OS monitoring module 106 unlinks the removed resource from the virtual guest 103. Then, the removed memory resource, for example block, is deleted, releasing memory space for other virtual guests 101 hosted on the host platform 100 so as to improve the overall system performance.

It is expected that during the life of a patent maturing from this application many relevant systems and methods will be developed and the scope of the term computing units, resources, storage resources, and memory is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing at least one resource allocated to a plurality of guest virtual machines, comprising:
   executing a plurality of guest virtual machines in a host platform managing at least one resource;
   allocating said at least one resource among said plurality of guest virtual machines;
   separately collecting, from each said guest virtual machine, resource usage data locally monitoring at least one of an operating system operation, an executed procedure, and an executed thread in each said guest virtual machine;
   gathering said resource usage data from each said guest virtual machine; and reallocating said at least one resource among said plurality of guest virtual machines according to an analysis of said gathered resource usage data from said plurality of guest virtual machines;

wherein said reallocating comprises calculating a cumulative contribution for each a plurality of resource allocations according to said analysis, selecting the resource allocation with the highest cumulative contribution of said plurality of resource allocations according to said calculating, and performing said reallocating according to said selecting.

2. The method of claim 1, wherein said gathering is performed in a plurality of sampling periods, said reallocating comprising performing a statistical analysis of said resource usage data from each said guest virtual machine and reallocating said at least one resource among said plurality of guest virtual machines according to said statistical analysis.

3. The method of claim 1, wherein said reallocating is performed by instructing a basic input output system (BIOS) of at least one of said plurality of guest virtual machines to change local allocation of at least one virtual resource.

4. The method of claim 1, wherein said reallocating is performed by instructing a guest operating system of at least one of said plurality of guest virtual machines to change local allocation of at least one virtual resource.

5. The method of claim 1, wherein said reallocating is performed by instructing at least one driver separately executed by at least one of said plurality of guest virtual machines to change local allocation of at least one virtual resource at said at least one guest virtual machine.

6. The method of claim 1, wherein said resource usage data comprises at least one of a deficiency and an excess of said at least one resource in a respective said guest virtual machine.

7. The method of claim 1, wherein said reallocating is performed without a shutdown or a halt of an operating system which is responsible for the allocation of resources to procedures in any of said plurality of guest virtual machines.

8. The method of claim 1, further comprising monitoring the availability of said at least one resource at said host platform; wherein said reallocating is performed according to said monitoring.

9. The method of claim 1, wherein said reallocating is performed by sending at least one hardware interrupt to a basic input output system (BIOS) or a driver of at least one of said plurality of guest virtual machines.

10. The method of claim 1, wherein said monitoring comprises monitoring a member of a group consisting of a kernel process, a kernel thread, a scheduling application, and kernel accessible application, said member being executed at least one of said plurality of guest virtual machines.

11. The method of claim 1, wherein said method is implemented by a module executed on a virtualization layer of said host platform.

12. The method of claim 1, wherein monitoring is performed by monitoring process scheduling of an operating system managing said at least one locally executed procedure in each said guest virtual machine.

13. A host platform for hosting a plurality of guest virtual machines and managing at least one resource allocated thereto, comprising:

a memory for hosting a plurality of guest virtual machines;

a plurality of monitoring modules each installed to collect resource usage data by locally monitoring at least one of an operating system operation, an executed procedure, and an executed thread in one of said plurality of guest virtual machines; and at least one resource; and a host controller which communicates with each said monitoring module to reallocate said at least one resource among said plurality of guest virtual machines according to an analysis of said collected resource usage data;

wherein said host controller calculates a cumulative contribution for each plurality of resource allocations according to said analysis, selects the resource allocation with the highest cumulative contribution of said plurality of resource allocations according to said calculating, and communicates with each said monitoring module to reallocate said at least one resource according to said selected resource allocation.

14. The host platform of claim 13, wherein each said monitoring module estimates a desired change in the allocating said at least one resource to a respective said hosting guest virtual machine according to said resource usage data and forwards a request to said host controller accordingly.

15. The host platform of claim 13, wherein said plurality of monitoring modules are installed in the user mode level of the operating system of said plurality of guest virtual machines.

16. The host platform of claim 13, wherein each said monitoring module is configured to update the basic input output system (BIOS) of the hosting said guest virtual machine.

17. The host platform of claim 13, wherein each said monitoring module is configured to communicate with at least one driver executed on the hosting said guest virtual machine.

18. The host platform of claim 13, wherein said host controller communicates with each said monitoring module via a connection channel with a guest operating system of a respective of said plurality of guest virtual machines.

19. The host platform of claim 13, wherein said monitoring module monitors the availability of said at least one resource, and reallocates said at least one resource according to said monitoring.

20. The host platform of claim 13, wherein said at least one resource comprises a member of a group consisting of: a central processing unit, a random access memory (RAM), a non-uniform memory architecture (NUMA) node, and a peripheral component interconnect (PCI) card.

21. The host platform of claim 13, wherein said host controller calculates a report summarizing statistic resource usage data of at least some of said guest virtual machines based on said analysis.

22. A computer program product, comprising at least one non-transitory computer usable medium having a computer readable program code embodied therein, said computer readable program code adapted to be executed to implement a method of managing at least one resource allocated to a plurality of guest virtual machines, said method comprising:

executing a plurality of guest virtual machines in a host platform managing at least one resource;

allocating said at least one resource among said plurality of guest virtual machines;

separately collecting, from each said guest virtual machine, resource usage data by locally monitoring at least one of an operating system operation, an executed procedure, and an executed thread in each said guest virtual machine;

gathering said resource usage data from each said guest virtual machine; and reallocating said at least one resource among said plurality of guest virtual machines according to an analysis of said gathered resource usage data from said plurality of guest virtual machines;

wherein said reallocating comprises calculating a cumulative contribution for each a plurality of resource allocations according to said analysis, selecting the resource allocation with the highest cumulative contribution of said plurality of resource allocations according to said calculating, and performing said reallocating according to said selecting.

\* \* \* \* \*